US010967381B2

(12) United States Patent
Rickenbach et al.

(10) Patent No.: US 10,967,381 B2
(45) Date of Patent: Apr. 6, 2021

(54) TRANSMISSION FOR AN ANIMAL FEED AND FOOD ROLLER MILL, AND ANIMAL FEED AND FOOD ROLLER MILL HAVING SAID TRANSMISSION

(71) Applicant: BÜHLER AG, Uzwil (CH)

(72) Inventors: Daniel Rickenbach, Wittenwil (CH); Daniel Mark, Wil (CH); Philippe Holenstein, Henau (CH); Kaspar Schindler, Teufenthal (CH)

(73) Assignee: BÜHLER AG, Uzwil (CH)

( * ) Notice: Subject to any disclaimer, the term of this patent is extended or adjusted under 35 U.S.C. 154(b) by 0 days.

(21) Appl. No.: 16/611,370

(22) PCT Filed: May 8, 2018

(86) PCT No.: PCT/EP2018/061793
§ 371 (c)(1),
(2) Date: Nov. 6, 2019

(87) PCT Pub. No.: WO2018/206544
PCT Pub. Date: Nov. 15, 2018

(65) Prior Publication Data
US 2020/0156080 A1 May 21, 2020

(30) Foreign Application Priority Data
May 9, 2017 (EP) ..................... 17170038

(51) Int. Cl.
*B02C 4/42* (2006.01)
*B02C 4/02* (2006.01)
(Continued)

(52) U.S. Cl.
CPC .................. *B02C 4/42* (2013.01); *B02C 4/02* (2013.01); *B02C 4/32* (2013.01); *F16H 1/222* (2013.01); *F16H 37/041* (2013.01)

(58) Field of Classification Search
CPC .... B02C 4/02; B02C 4/32; B02C 4/42; F16H 1/222; F16H 1/22; F16H 37/041
See application file for complete search history.

(56) References Cited

U.S. PATENT DOCUMENTS 5,088,651 A * 2/1992 Takahashi et al. ....... B02C 4/42
241/30
2002/0074435 A1 6/2002 Kasada et al.
(Continued)

FOREIGN PATENT DOCUMENTS

CN 201 090 673 Y 7/2008
CN 101338810 A 7/2009
(Continued)

OTHER PUBLICATIONS

International Search Report Corresponding to PCT/EP2018/061793 dated Jul. 27, 2018.
(Continued)

*Primary Examiner* — Faye Francis
(74) *Attorney, Agent, or Firm* — Davis & Bujold PLLC; Michael J. Bujold

(57) ABSTRACT

A transmission (1) for a feed and foodstuff roller mill (2) with a plurality of rotatably drivable rollers. The transmission (1) has a bearing housing (3) in which an input shaft (4), a first output shaft (5) and a second output shaft (6) are accommodated. The input shaft (4) and the first output shaft (5) are arranged perpendicular to one another and the first output shaft (5) and the second output shaft (6) are arranged parallel to one another. The input shaft (4) and the first output shaft (5) are operatively connected to one another via a bevel gearwheel pair (7, 7'), and the first output shaft (5) and the second output shaft (6) are operatively connected to one another via a torque transmitting arrangement.

9 Claims, 2 Drawing Sheets

Figure 1:
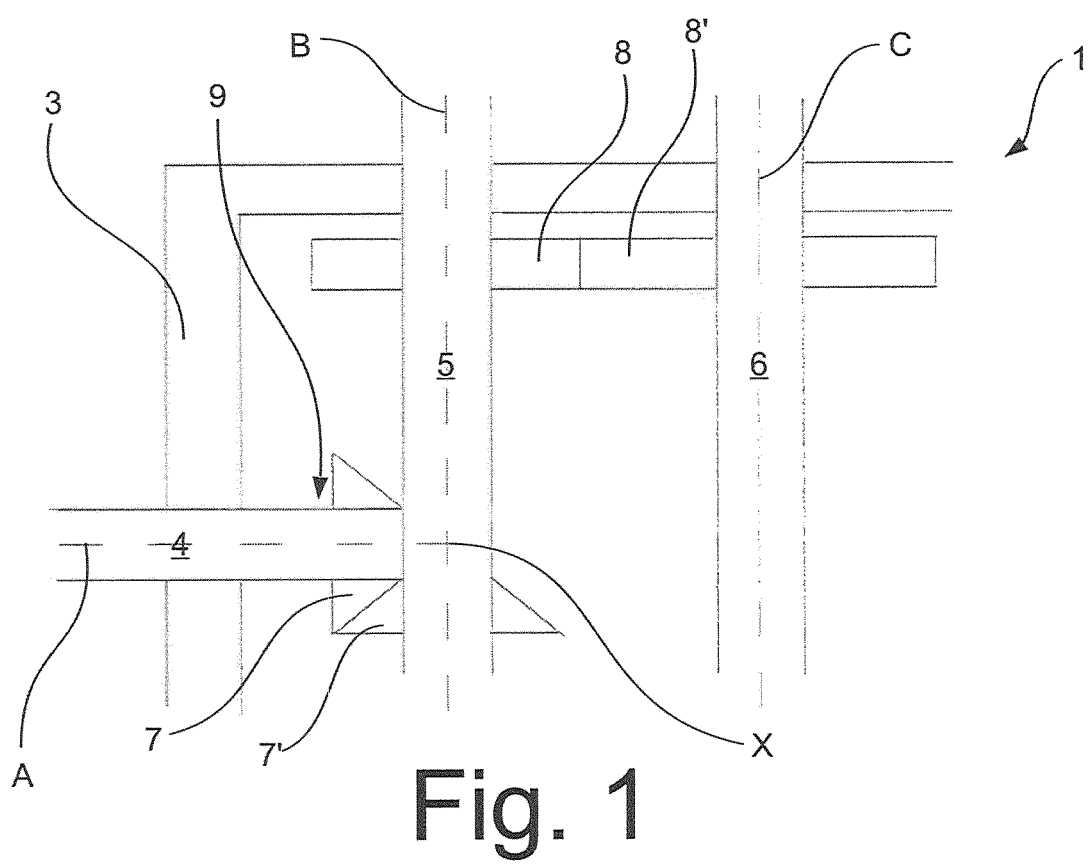

(51) Int. Cl.
*B02C 4/32* (2006.01)
*F16H 1/22* (2006.01)
*F16H 37/04* (2006.01)

(56) References Cited

U.S. PATENT DOCUMENTS

| | | | |
|---|---|---|---|
| 2007/0246587 A1* | 10/2007 | Potts | B02C 4/286 241/235 |
| 2008/0296424 A1* | 12/2008 | Frangenberg | B30B 3/04 241/231 |
| 2011/0101139 A1* | 5/2011 | Inoue | B02C 25/00 241/37 |
| 2013/0087054 A1* | 4/2013 | Frangenberg | B30B 3/04 100/35 |
| 2017/0274384 A1* | 9/2017 | Pohling | B02C 4/30 |
| 2018/0209517 A1 | 7/2018 | Rath et al. | |

FOREIGN PATENT DOCUMENTS

| | | |
|---|---|---|
| CN | 102 588 560 A | 7/2012 |
| CN | 203051634 U | 7/2013 |
| CN | 205 270 349 U | 6/2016 |
| DE | 174 199 | 12/1904 |
| DE | 410 300 | 2/1925 |
| DE | 859 558 | 7/1949 |
| DE | 1 033 995 | 7/1958 |
| DE | 1 247 124 | 8/1967 |
| DE | 3433577 A1 | 3/1986 |
| DE | 41 04 439 A1 | 8/1992 |
| DE | 195 22 093 A1 | 1/1997 |
| DE | 20 2004 006 307 U1 | 9/2005 |
| DE | 10 2015 105 655 B3 | 7/2016 |
| EP | 0 429 658 A1 | 6/1992 |
| EP | 0 752 272 A1 | 1/1997 |
| EP | 0 949 003 A2 | 10/1999 |
| EP | 2 689 852 A2 | 1/2014 |
| EP | 2 883 612 A1 | 6/2015 |
| WO | 90/14164 A1 | 11/1990 |
| WO | 90/14165 A1 | 11/1990 |
| WO | 01/32312 A1 | 5/2001 |

OTHER PUBLICATIONS

Written Opinion Corresponding to PCT/EP2018/061793 dated Jul. 27, 2018.

International Preliminary Report on Patentability Corresponding to PCT/EP2018/061793 dated Nov. 21, 2019.

Chinese Office Action issued in the corresponding Chinese Patent Application No. 2020082802138420 dated Sep. 2, 2020.

* cited by examiner

TRANSMISSION FOR AN ANIMAL FEED AND FOOD ROLLER MILL, AND ANIMAL FEED AND FOOD ROLLER MILL HAVING SAID TRANSMISSION

The invention is related to a transmission for a feed and foodstuff roller mill and a feed and foodstuff roller mill with such a transmission.

The transmission unit or the foodstuff roller mill according to the invention is used in particular for processing cereals in the milling industry (in particular for milling soft wheat, durum, rye, maize and/or barley) or in the special milling industry in particular for peeling and/or milling soya, buckwheat, barley, spelt, millet/sorghum, pseudo cereals and/or pulses); the production of feed for farm and domestic animals, fish and crustaceans; the processing of oilseeds; the processing of biomass and the production of energy pellets; the industrial malting and malting and the processing of cocoa beans, nuts and coffee beans.

A feed and foodstuff roller mill usually comprises at least two rollers which are driven in opposite directions and, if necessary, at different speeds. By selecting the roller surface, grinding gap width, roller contact pressure and speed difference, the feed and foodstuff roller mill can be used in a number of process steps.

In known feed and foodstuff roller mills, the rollers are driven by belts and pulleys. Herein, the belts are subject to wear, so that worn belt particles can enter the product flow, which is undesirable in terms of hygiene. In addition, the assembly and maintenance of such a belt drive is very burdensome, as a large number of individual parts have to be removed and reassembled. Furthermore, belts and pulleys are often only protected by protective covers and are therefore questionable for safety reasons.

It is therefore the problem of the invention to provide a transmission for a feed and foodstuff roller mill as well as a feed and foodstuff roller mill of the type mentioned above, which overcome the disadvantages of the art and in particular allow a hygienic design, a simplified assembly arid disassembly as well as a more accurate measurement of the roller contact pressure, and which have a higher efficiency than devices according to the state of the art.

The task is solved with a transmission for a feed and foodstuff roller mill with a plurality of rollers according to the independent claim.

The transmission comprises a bearing housing in which an input shaft, a first output shaft and a second output shaft are accommodated.

The input shaft and the first output shaft are perpendicular to each other, wherein the first output shaft and the second output shaft are arranged parallel to each other.

The input shaft and the first output shaft are operatively connected via a bevel gearwheel pair.

The first output shaft and the second output shaft are also operatively connected via a torque transmitting arrangement.

The torque transmitting arrangement is preferably designed as a spur gearwheel pair, with one gearwheel being arranged on the first output shaft and the other gearwheel being arranged on the second output shaft.

The torque transmitting arrangement can alternatively be designed as a continuously variable transmission, in particular as a CVT transmission. This has the advantage that the gear transmission or reduction between the first and second output shaft is infinitely variable and very easily adjustable, without, for example, having to replace the gearwheels of a spur gearwheel pair.

The first output shaft is used to drive the first roller of the feed and foodstuff roller mill.

The second output shaft is used to drive the second roller.

If the feed arid foodstuff roller mill comprises more than two rollers, the transmission may comprise further output shafts which are driven by both the first output shaft and the second output shaft.

The invention permits a compact and hygienic design and can also be used to upgrade existing feed and foodstuff roller mills, since the transmission according to the invention can be mounted on one side and installed with relatively little effort.

In state-of-the-art feed and foodstuff roller mills, the drive or drive pulleys are often arranged on one side of the rollers, and the so-called overdrive is arranged on the other side of the rollers. The drive belt is tensioned by means of a tensioning device. This does not only lead to a one-sided loading of the rollers, which influences the gap width, but also complicates the determination of the roller contact pressure, since the tension force of the drive belt, which depends on various factors, must be taken into account. Due to the one-sided arrangement of the drive and the overdrive, the transmission according to the invention allows the decoupling of transversal forces, so that the roller contact pressure can be determined more easily. It also enables the use of standard electric motors to drive the input shaft.

The transmission is preferably designed in such a way that it can be attached to a mill frame for torque support.

Preferably the axes of the input shaft, the first output shaft and the second output shaft are in a common plane.

Such an arrangement allows an even more compact design of the transmission, so that it can also be used under circumstances of confined space.

The point of intersection of the input shaft axis with the first output shaft axis is preferably arranged between the bevel gear wheel and the torque transmission arrangement.

In particular, the point of intersection is arranged between the bevel gear wheel and the spur gear wheel of the first output shaft.

The point of intersection can also be arranged between the bevel gear wheel and a gear wheel or a pulley of the continuously variable transmission mounted on the first output shaft.

This variant also permits a particularly compact design of the transmission.

The bevel gear wheel of the input shaft is preferably arranged at its face end.

Preferably the first output shaft and/or the second output shaft is mounted on both sides.

In one embodiment with a torque transmission arrangement in the form of a spur gearwheel pair, the spur gearwheel pair preferably has a (speed) reduction ratio, in particular between 1:1.25 and 1:3.

The bearing housing preferably encloses the entire transmission. Of course, the input shaft and the first as well as the second output shaft are mounted in such a way that a drive or the rollers can be connected via e.g. couplings. A closed design of the transmission is preferred, as this not only improves the hygiene of the product line, but also protects the transmission itself from the often harsh environmental conditions.

The problem is also solved by a feed and foodstuff roller mill according to the claims.

The feed and foodstuff roller mill comprises at least two rollers mounted for rotation about a longitudinal axis.

At least one roller is fixedly supported and the other roller is movably supported, so that a roller gap width can be adjusted.

According to the invention, the feed and foodstuff roller mill comprises a transmission as described above.

The input shaft is coupled with a drive for driving the transmission and consequently the output shafts.

The first output shaft is preferably coupled with the fixedly arranged roller and the movably arranged roller with the second output shaft. Reverse coupling is also conceivable, so that the description below of the preferred coupling options can be applied accordingly.

This means that a feed and foodstuff roller mill with a transmission according to the invention can be operated simply, compactly and hygienically. The very space-consuming and hygienically not particularly advantageous arrangement of belt pulleys and belts is eliminated, so that the safety of a feed and foodstuff roller mill is also increased. In addition, a feed and foodstuff roller mill can be provided, which is equipped with a drive ex works.

The fixed roller is preferably coupled to the first output shaft via an elastic clutch. The elastic clutch is in particular a dog clutch.

Thus, the first output shaft can easily be mounted on a roller drive stub.

The movably arranged roller is preferably coupled with the second output shaft via a telescopic cardan shaft.

Since the second roller is movably mounted to adjust a roller gap, but the distance between the first and second output shafts of the transmission is fixed due to design reasons, the coupling with a telescopic cardan shaft can solve the problem of axle misalignment simply and in a space-saving manner. In addition, such a connection also permits quick assembly and disassembly of the transmission.

Generally, the second roller is operated at a lower rotational speed than the first roller. When material is inserted into the roller gap and the second roller is engaged to adjust the roller gap, the second roller is accelerated due to friction with the material. The transmission according to the invention, in particular the torque transmitting arrangement, prevents the second roller from taking up the rotational speed of the first roller and virtually assumes a "braking function".

Figure 2:
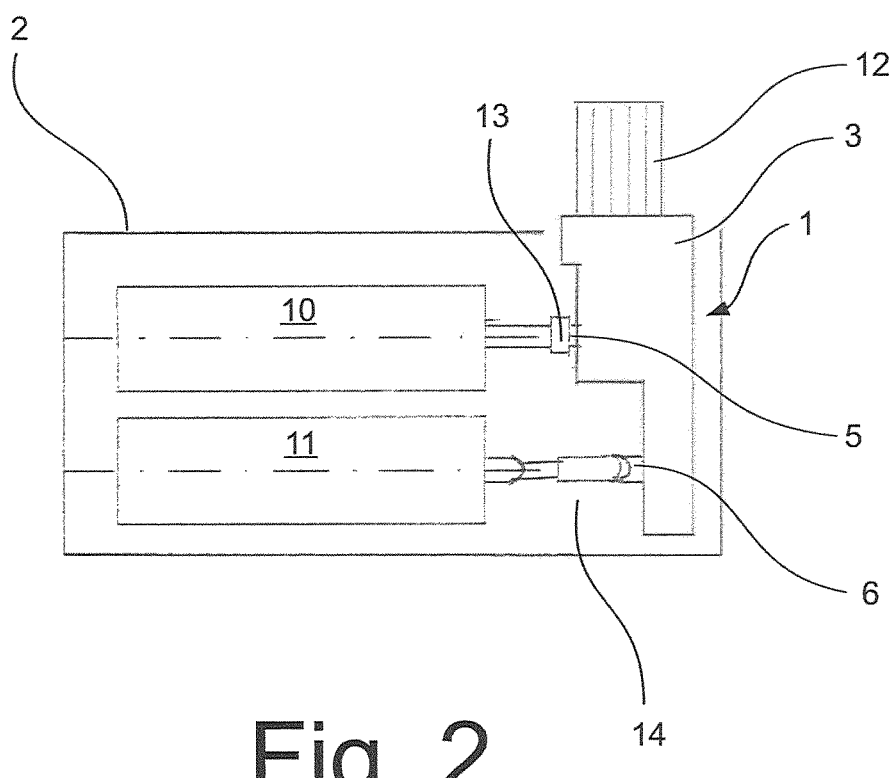

FIG. 1 the schematic design of a transmission in accordance with the invention; and FIG. 2 a schematic top view of a feed and foodstuff roller mill with a transmission according to the invention.

FIG. 1 schematically shows a transmission 1. Transmission 1 comprises a bearing housing 3, which is only partially shown for the sake of clarity. It goes without saying that the bearing housing 3 can completely enclose the transmission 1 and be designed in several parts.

Transmission 1 comprises a rotatably mounted input shaft 4, the axis of which is designated as A. When operating a feed and foodstuff roller mill, the input shaft is driven by a drive not shown. A bevel gearwheel 7 is arranged at one end 9 of the input shaft 4.

Transmission 1 also includes a first output shaft 5 and a second output shaft 6, which are arranged parallel to each other. The axes of the first and second output shafts 5 and 6 are designated as B and C, respectively. The first and second output shafts 5 and 6 are also mounted in the bearing housing 3. FIG. 1 schematically shows only a one-sided bearing arrangement. It should be noted, however, that double sided bearing arrangement is more advantageous.

The input shaft 4 and the first and second output shafts 5 and 6 are arranged in such a way that their axes A, B and C respectively lie in a common plane (in this case the drawing plane). The input shaft 4 is arranged perpendicular to the two output shafts 5 and 6.

To drive the first output shaft 5, the spur bevel gearwheel 7 engages in a complementary bevel gearwheel 7' which is arranged on the first output shaft 5. To drive the second output shaft 6, transmission 1 comprises a spur gearwheel pair 8 and 8'. The spur gearwheel 3 is arranged on the first output shaft 5 and meshes with the complementary spur gearwheel 8' of the second output shaft 6. The spur gearwheel pair 8 and 8' also assumes a braking function of the second output shaft 6 if the second output shaft 6 is coupled with a roller which is driven at a lower rotational speed than the roller driven by the first output shaft 5.

As shown in FIG. 1, the spur gearwheel 8 and the bevel gearwheel 7' of the first output shaft 5 are arranged, with respect to an intersection X of the axis A of the input shaft 4 with the axis B of the first output shaft 5, on both sides of the intersection X of the first output shaft 5 along the axis B. This enables a very compact design of the transmission 1.

Such a transmission 1 is used in a feed and foodstuff roller mill 2, as shown schematically in FIG. 2. The feed and foodstuff roller mill 2 comprises a first and a second roller 10 and 11, respectively. The roller 13 can be moved to adjust a roller gap, while the roller 10 is fixedly arranged in a roller mill frame.

To drive both rollers 10 and 11, a transmission 1 is provided on one side of the rollers 10 and 11, wherein in FIG. 2 only the bearing housing 3 of the transmission 1 is visible.

The input shaft 4 is driven by a motor 12. To drive the two rollers 10 and 11, an elastic dog clutch 13 and a telescopic cardan shaft 14 are arranged on the first output shaft 5 and on the second output shaft 6, respectively. The telescopic cardan shaft 14 allows an axis offset between the rotation axis of the roller 11 and the second output shaft 6, which is generated by the movement of the second roller 11.

The invention claimed is:

1. A feed and foodstuff roller mill comprising at least two rotatably mounted rollers,
    wherein a first of said two rotatably mounted rollers is fixedly mounted and a second of said two rotatably mounted rollers is movably mounted, comprising a transmission with
    a bearing housing in which:
        a first output shaft for driving said first roller, and
        a second output shaft for driving said second roller are accommodated, wherein
    the first output shaft is coupled to said first roller and the second output shaft is coupled to said second roller; and
    the first output shaft and the second output shaft are operatively connected to one another by means of a torque transmitting arrangement,
    wherein an input shaft is also accommodated in the transmission,
    wherein the input shaft is coupled to a drive,
    wherein the input shaft and the first output shaft are arranged perpendicular to one another and the first output shaft and the second output shaft are arranged parallel to one another,
    the input shaft and the first output shaft are operatively connected to one another by means of a bevel gearwheel pair,
    an axes of the input shaft, an axis of the first output shaft and an axis of the second output shaft lie in a common plane; and an intersection point of the axis of the input shaft with the axis of the first output shaft is arranged between the bevel gearwheel and the torque transmitting arrangement of the first output shaft.

2. The feed and foodstuff roller mill according to claim 1, wherein the bevel gearwheel of the input shaft is arranged at a face end of said input shaft.

3. The feed and foodstuff roller mill according to claim 1, wherein the first output shaft is mounted at its both side ends.

4. The feed and foodstuff roller mill according to claim 1, wherein the second output shaft is mounted at its both side ends.

5. The feed and foodstuff roller mill according to claim 1, wherein the torque transmitting arrangement is formed as a spur gearwheel pair.

6. The feed and foodstuff roller mill according to claim 5, wherein the spur gearwheel pair has a speed reduction ratio of between 1:1.25 and 1:3.

7. The feed and foodstuff roller mill according to claim 1, wherein the bearing housing encloses the entire transmission.

8. The feed and foodstuff roller mill according to claim 1, wherein the first roller, which is fixedly mounted, is coupled to the first or second output shaft by means of an elastic clutch.

9. The feed and foodstuff roller mill according to claim 1, wherein the second roller, which is movably mounted, is coupled to the first or second output shaft by means of a telescopic cardan shaft.

* * * * *